United States Patent [19]
Seki et al.

[11] Patent Number: 5,737,480
[45] Date of Patent: *Apr. 7, 1998

[54] DATA RECORDING APPARATUS

[75] Inventors: Takahito Seki; Yukio Kubota; Keiji Kanota, all of Kanagawa; Hajime Inoue, Chiba, all of Japan

[73] Assignee: Sony Corporation, Tokyo, Japan

[*] Notice: The term of this patent shall not extend beyond the expiration date of Pat. No. 5,526,199.

[21] Appl. No.: 583,287

[22] Filed: Jan. 5, 1996

Related U.S. Application Data

[63] Continuation of Ser. No. 417,263, Apr. 5, 1995, Pat. No. 5,526,199, which is a continuation of Ser. No. 147,579, Nov. 5, 1993, abandoned.

[30] Foreign Application Priority Data

Nov. 6, 1992 [JP] Japan ................................. 4-322489

[51] Int. Cl.$^6$ ........................... H04N 5/917; H04N 5/91
[52] U.S. Cl. ..................................... 386/109; 386/46
[58] Field of Search ................................. 358/335, 342, 358/310, 312, 311; 360/32, 33.1, 13, 10.1, 10.3; 348/384; 386/46, 109, 111, 112, 124, 33; H04N 5/917, 5/91

[56] References Cited

U.S. PATENT DOCUMENTS

| | | | |
|---|---|---|---|
| 5,136,391 | 8/1992 | Minami | 386/33 |
| 5,377,051 | 12/1994 | Lane et al. | 360/33.1 |

*Primary Examiner*—Robert Chevalier
*Attorney, Agent, or Firm*—William S. Frommer; Alvin Sinderbrand

[57] ABSTRACT

Digital data representing a compressed image is separated into priority data and normal data, and formatted so that the priority data is repeatedly recorded on a magnetic tape. The transmission rate of the digital data is compared with the recording rate on the magnetic tape to control the number of repetitions of the priority data.

5 Claims, 8 Drawing Sheets

SEVERAL TRACKS

1 SYNC BLOCK

| PD | PD | ND | PD | PD | ND |

DATA RECORDING APPARATUS

This application is a continuation of application Ser. No. 08/417,263, filed Apr. 5, 1995, now patented (U.S. Pat. No. 5,526,199) and which is a Continuation of parent application 08/147,579, filed Nov. 5, 1993 now abandoned.

BACKGROUND OF THE INVENTION

The present invention relates to a data recording apparatus, and, more particularly, is directed to a digital video tape recorder having special reproduction modes.

A digital video tape recorder is designed to record both video data and audio data in digital form on a magnetic tape. A temporally long segment of high-definition digital video data can be compressed before being recorded so as to occupy a relatively small recording capacity of a magnetic tape. Also, an analog video signal can be digitized and orthogonally transformed into frequency component coefficients, that is, digital video data also referred to herein as an advanced television (ATV) signal, by an external source, and the ATV signal can be recorded and reproduced by the digital video tape recorder.

In a special or trick reproduction mode, such as cue or review, the magnetic tape is quickly scanned in either a forward or reverse direction, and only part of the data recorded in each track of the magnetic tape is reproduced. Typically, in the special reproduction mode, conventional digital video tape recorders provide deteriorated quality reproduction of a compressed picture recorded on a magnetic tape.

OBJECTS AND SUMMARY OF THE INVENTION

Therefore, an object of the present invention is to provide a data recording apparatus which avoids the aforementioned disadvantages of the prior art.

Another object of the present invention is to record digital video data on a magnetic tape so as to improve image reproduction in a special reproduction mode.

Yet another object of the present invention is to record digital data representing an image so that the data most essential to reproduction of an image has the highest probability of being properly reproduced.

In accordance with an aspect of this invention, data recording apparatus separates input data into priority data and normal data which are formatted in a predetermined format wherein the priority data is repeated, thus producing first formatted priority data, repeat formatted priority data and formatted normal data for recording in physical tracks on a recording medium.

Since the priority data is recorded repeatedly, the probability of its reproduction in a special reproduction mode is increased, thus improving the quality of an image reproduced in the special reproduction mode.

In accordance with another aspect of this invention, the recording rate of the recording medium and the transmission rate of the input data are compared and the number of times the priority data is repeated is controlled as a function of the comparison.

Since the number of times the priority data is repeated depends upon the comparison of recording rate and input transmission rate, it is possible to prevent partial dropout of the normal data due to repetition of the priority data when the recording rate is insufficiently high to accommodate such repetition.

In accordance with a further aspect of this invention, the repeat formatted priority data comprises one repetition of the first formatted priority data, but, if the comparison of the recording rate of the recording medium and the transmission rate of the input data indicates that the recording rate is insufficient when the priority data is repeated, then the repeat formatted priority data comprises zero repetitions of the first formatted priority data.

In accordance with yet another aspect of this invention, the input data comprises digital data representing an image, such as discrete cosine transformation coefficients. The first formatted priority data and the repeat formatted priority data are substantially at the center of each logical track of the predetermined format, and each logical track is recorded in a respective physical track.

The above, and other objects, features and advantages of the present invention will be apparent in the following detailed description of the preferred embodiments of the present invention when read in conjunction with the accompanying drawings in which corresponding parts are identified by the same reference numeral.

DETAILED DESCRIPTION OF THE PREFERRED EMBODIMENTS

The present invention recognizes that certain of the compressed video data are essential for adequate reproduction of an image, whereas the remainder of the compressed video data may be omitted with relatively less effect on the quality of the reproduced image. The essential compressed video data are referred to herein as priority data (PD) while the remainder of the data are referred to as normal data (ND).

For example, in the case of an ATV signal comprising orthogonal transform coefficients, such as discrete cosine transform coefficients, the low frequency components alone are more essential to proper reproduction of an image than the high frequency components alone. Thus, the low frequency components comprise the priority data PD, while the high frequency components comprise the normal data ND.

In another case wherein pictures representing motion are predictively encoded into one of an I picture, which is coded without reference to another picture, a P picture, which is coded with reference to a temporally preceding picture, and a B picture, which is coded with reference to a temporally preceding picture and a temporally succeeding picture (see, for example, ISO/IEC recommendation H.26x, popularly known as the proposed "MPEG 2" standard), the data representing I pictures comprises the priority data PD, while the data representing P and B pictures comprises the normal data ND.

A data recording apparatus according to the present invention is operative to repeatedly record the priority data for a picture when a comparison of the input transmission rate and maximum recording rate indicates there is adequate capacity for such repetition. The priority data may be repeatedly recorded on the same track or on multiple tracks.

Since the priority data is repeatedly recorded, the probability of its reproduction during a special reproduction mode (e.g., fast playback) is higher than for normal data. Therefore, in the present invention, the portion of the compressed data which is most essential to reproduction of a recognizable picture is most likely to be reproduced. Thus, the present invention improves the quality of a picture reproduced in a special reproduction mode, such as cue or review.

Figure 1:
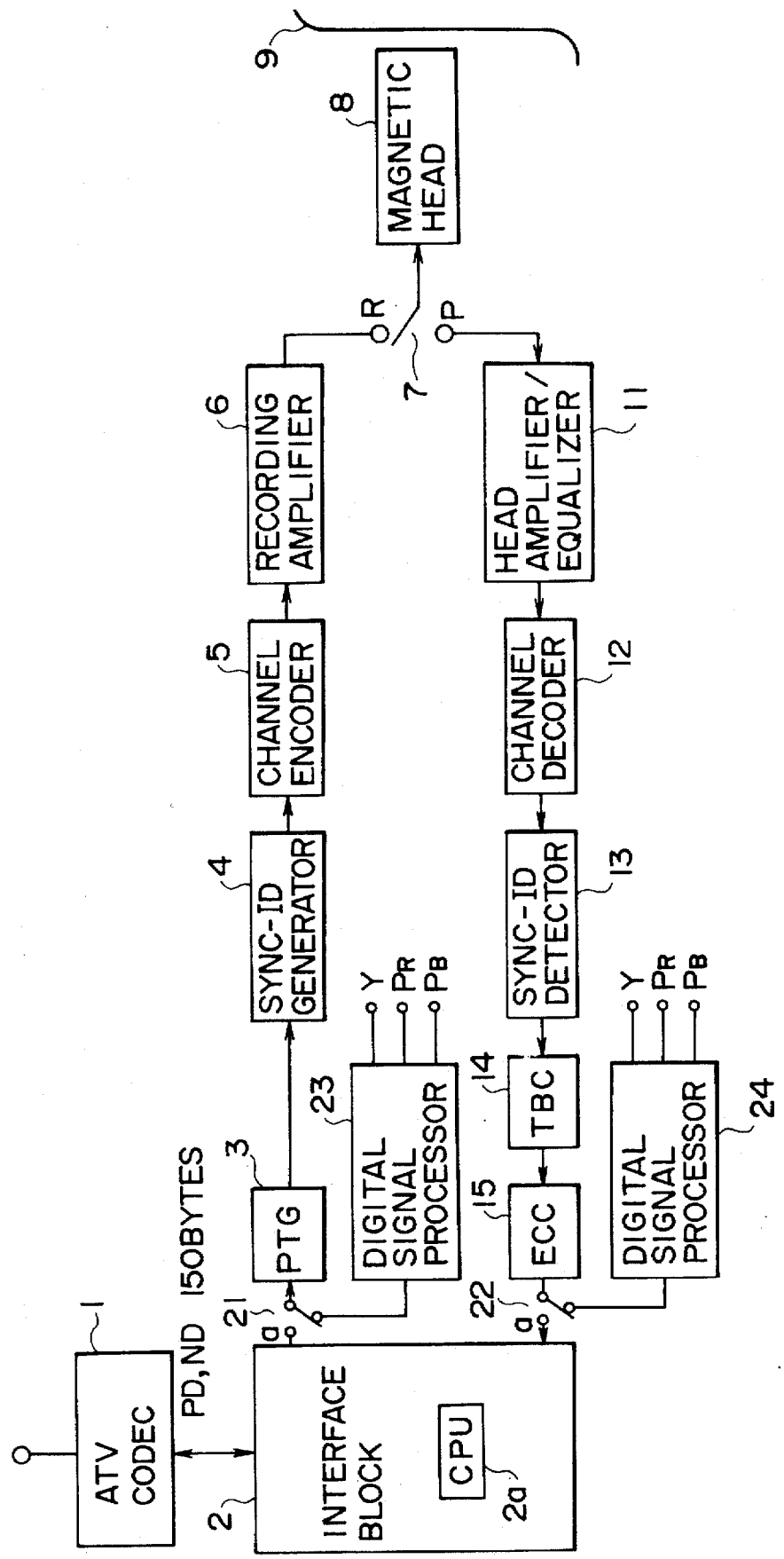
FIG. 1 is a block diagram of an embodiment of a digital video recording and reproducing apparatus according to the present invention.

Referring now to the drawings, and in particular to FIG. 1, there is illustrated an embodiment of a data recording apparatus according to the present invention. The apparatus illustrated in FIG. 1 is adapted to digitally record and reproduce video data supplied thereto, and comprises an ATV codec 1, an interface block 2 including a CPU 2a, a parity generator 3, a sync and ID code generator 4, a channel encoder 5, a recording amplifier 6, switches 7, 21 and 22, a magnetic head 8, a head amplifier/equalizer 11, a channel decoder 12, a sync and ID code detector 13, a time base corrector (TBC) 14, an error detection and correction (ECC) circuit 15, and digital signal processors 23, 24.

ATV codec 1 is adapted to receive input video data such as a compressed high-definition television signal (e.g. discrete cosine transform coefficients) and related input audio data from a circuit, not shown, to separate the input data into priority data PD and normal data ND, and to supply the separated data to an interface block 2.

The interface block 2 is operative to format (pack) the priority data and the normal data inputted from the ATV codec 1 into a data format for recording on a magnetic tape 9 and to supply the packed data to a contact "a" of the switch 21. The interface block 2 includes CPU 2a which functions to compare the recording rate on the magnetic tape 9 with the input data transmission rate and to control the packing in accordance with the result of this comparison. The switch 21 supplies the packed data to parity generator (PTG) 3.

A luminance signal Y and color difference signals $P_R$; $P_B$ may be supplied to digital signal processor 23 which is adapted to perform analog-to-digital conversion on these signals and also to format them into digital video data, and to supply the digital video data to a contact "b" of the switch 21. The switch 21 may be controlled by a control signal (not shown) to supply to the parity generator 3 the digital video data from the processor 23 instead of the packed data from the interface block 2.

The parity generator 3 serves to add parity code data to the data from interface block 2 or processor 23, and to supply the thus augmented packed data to sync and ID code generator 4.

The generator 4 functions to add a sync word and ID data to the packed data and parity code data and to supply the resulting signal to channel encoder 5.

The channel encoder 5 is operative to modulate the data supplied thereto from the generator 4 and to apply the modulated data to recording amplifier 6 which functions to amplify the modulated data and apply it to a contact "R" of switch 7. The switch 7 supplies the amplified data to rotary magnetic head 8 which serves to record the data in slant tracks on the magnetic tape 9.

Figure 2:
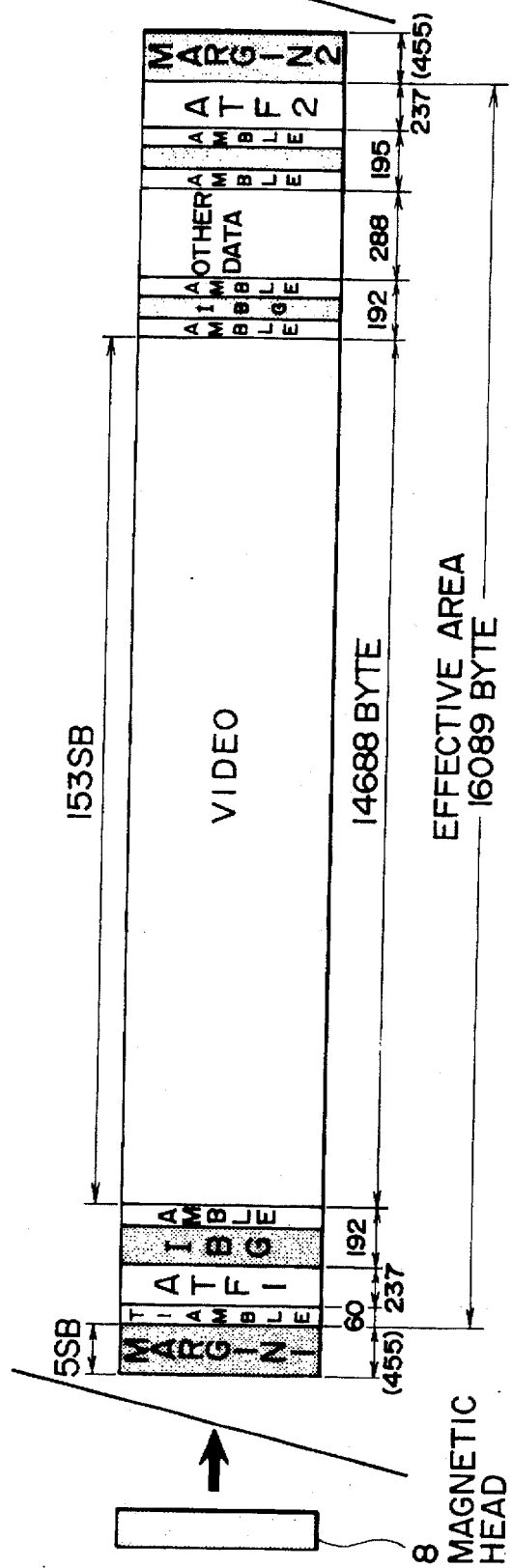
FIG. 2 illustrates a track format on a magnetic tape employed in FIG. 1.

FIG. 2 illustrates an example of a track format for a track recorded on the magnetic tape 9. As shown, an effective area of each slant track has a length of 16089 bytes. Margins 1 and 2, each of 455 bytes, are formed before and after the effective area, respectively, to accommodate variation in positioning due to jitter.

A T-amble area of 60 bytes is formed at the beginning of the effective area in the forward direction of the magnetic head 8, and an ATF1 area of 237 bytes is formed subsequent thereto. An interblock gap (IBG) and a preamble area (for convenience, preamble and postamble areas are referred to herein simply as "amble" areas) are formed in a succeeding area of 192 bytes. The T-amble contains a signal used for generating a timing signal which is required for reproducing the recorded data from the ATF1 area. The ATF1 area contains tracking control data. The amble area following the IBG contains a signal used for generating a timing signal required for reproducing the recorded data from a succeeding video area. And the video area following the amble has a length of 14688 bytes and is used for recording the video data.

Following the video area, in a length of 192 bytes, there are formed a postamble, an interblock gap and another preamble. A succeeding area of 288 bytes is used for recording other data, such as audio data. Thereafter, in a length of 195 bytes, there are formed a postamble, an interblock gap and a preamble, followed by an ATF2 area formed in a succeeding area of 237 bytes for recording another tracking control signal.

Figure 3:
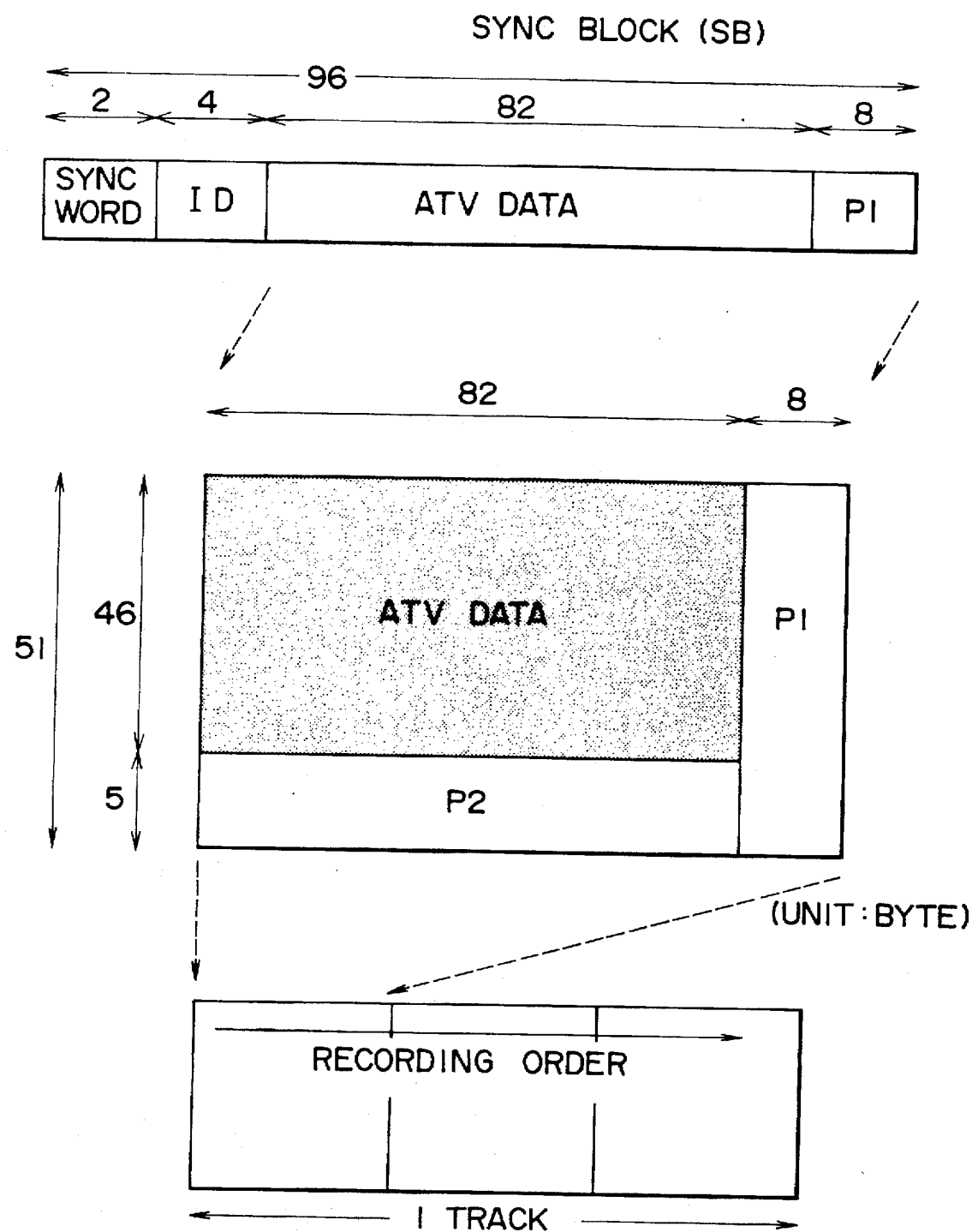
FIG. 3 illustrates a data format of a video area shown in FIG. 2.

FIG. 3 illustrates the structure of data in the video area shown in FIG. 2. In this video area, the data is recorded in units of sync blocks. Here, each sync block (SB) has a length of 96 bytes. The first 2 bytes of a sync block are used for recording a sync word which serves as a sync signal, and the next 4 bytes are used for recording ID data to identify the sync block. Following the ID data, video data (ATV data) may be recorded in a length of 82 bytes. The last 8 bytes of the sync block are used for recording a horizontal parity code P1.

A vertical parity code P2 of 5 sync blocks is added to 46 sync blocks of the ATV data and the parity code P1 to form a unit of 51 sync blocks. Three units of 51 sync blocks are grouped and recorded as 153 sync blocks in the video area of each track. The data recording sequence is in accordance with the direction of the line shown in FIG. 3 for these three units.

Returning to FIG. 1, it will be seen that, during a playback mode, the magnetic head 8 applies data reproduced from the magnetic tape 9 to a contact P of the switch 7 and thence to head amplifier/equalizer 11 which functions to compensate higher frequency components of the input data and to supply compensated data to channel decoder 12.

The channel decoder 12 functions to demodulate the compensated data and to supply demodulated data to sync and ID code detector 13 which is adapted to detect sync words and ID data present in the demodulated data and to supply the detected data with the demodulated data (video or audio data) to time base corrector (TBC) 14.

The TBC 14 is operative to correct the time base of the demodulated video or audio data and to supply time base corrected data to ECC circuit 15 which functions to detect and correct errors in the reproduced data and to apply the corrected data to switch 22.

The switch 22 applies the corrected data to the interface block 2 through a contact "a". The interface block 2 is further operative to deformat (depack) the reproduced data and to apply the depacked data to the ATV codec 1.

Alternatively, a control signal (not shown) may cause the switch 22 to apply the corrected data from the ECC circuit to a contact "b" which in turn applies the corrected data to digital signal processor 24 that is adapted to reformat the corrected data and perform digital-to-analog conversion thereof to produce a luminance signal Y and color difference signals $P_R$, $P_B$. These analog signals may be supplied to another system (not shown).

A recording operation of the embodiment of the present invention shown in FIG. 1 will now be described below.

Figure 4:
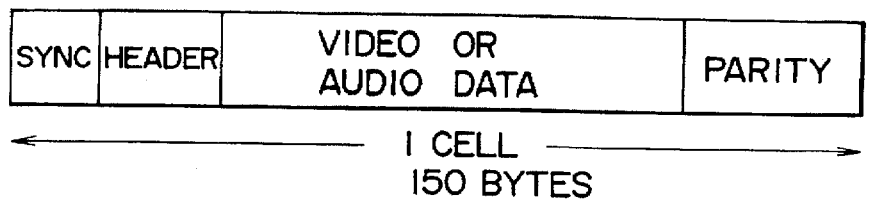
FIG. 4 illustrates a format for data inputted to an ATV codec shown in FIG. 1.

FIG. 4 shows the format of cells of ATV data received by the ATV codec 1 during recording. Each cell has a total length of 150 bytes and includes sync data, header data, video or audio data (as the case may be) and parity data. The sync data are a sync signal for separating the cells. The header data includes ID data for identifying the cell. The video or audio data are recorded in the video or audio data areas of a track. The parity data are a code for detecting and correcting errors in the video or audio data.

Figure 5A:
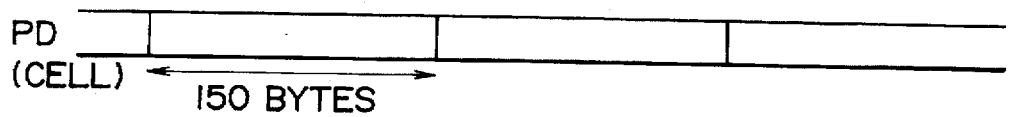
FIG. 5 is a timing chart used for explaining the operation of an interface block shown in FIG. 1.
Figure 5B:
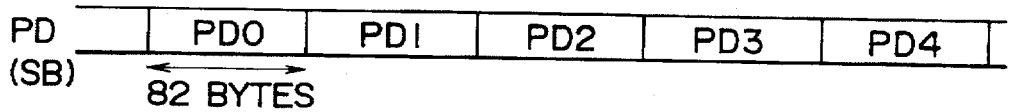
Figure 5C:
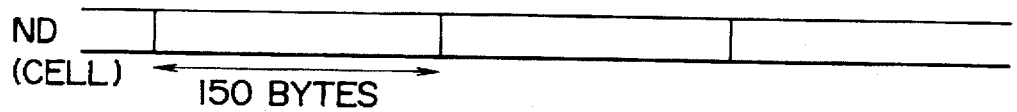

The ATV codec 1 separates the input ATV data of each cell into priority data PD and normal data ND, and, as shown in the timing diagrams of FIGS. 5(a) and 5(c), supplies the separated data in units of, e.g., 150 bytes, comprising either priority data or normal data, to the interface block 2.

Figure 5D:
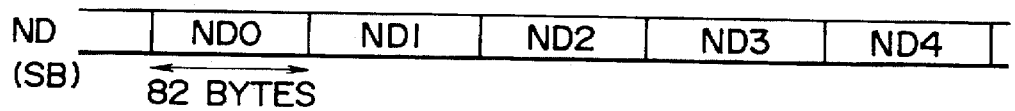

The interface block 2 formats the data of each cell into multiple sync blocks in the format of FIG. 3. Thus, as shown in FIGS. 5(b) and 5(d), the priority data PD and the normal data ND are respectively formatted into sync blocks each having 82 bytes.

Figure 6:
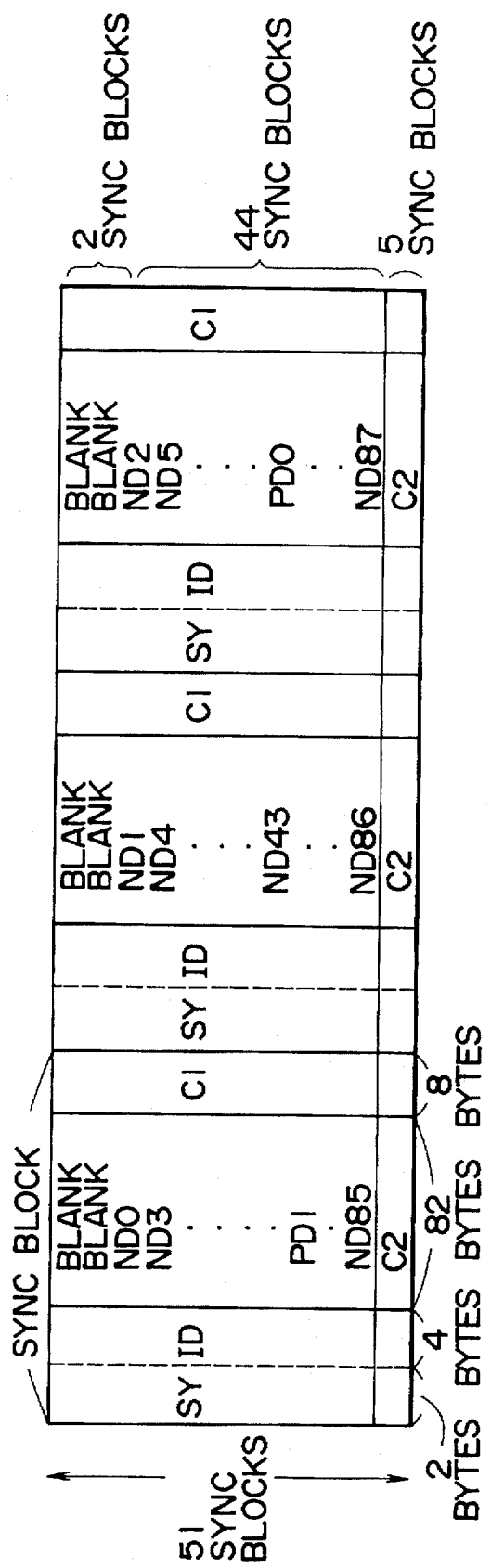
FIG. 6 illustrates a data format of a logical track recorded in a physical track to which reference is made in explaining the operation of the apparatus shown in FIG. 1.
Figure 7:
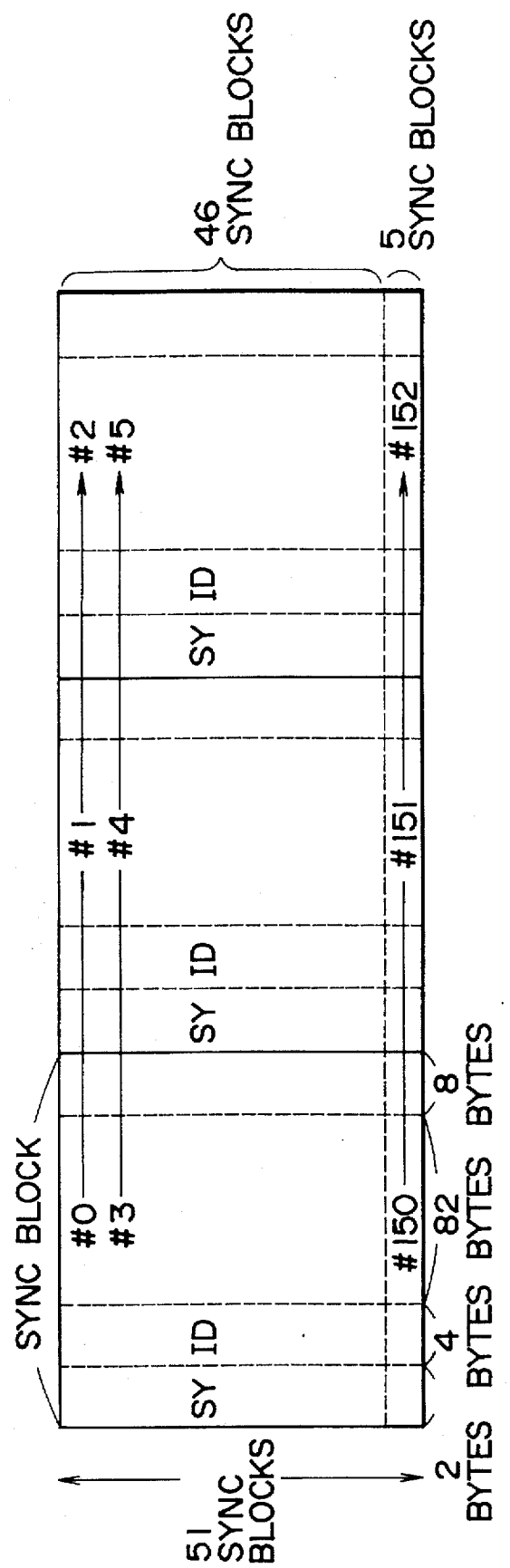
FIG. 7 illustrates a read out sequence for the data format shown in FIG. 6.

The interface block 2 temporarily stores an amount of input video data corresponding to one track, that is, 3×2 unused sync blocks followed by 3×44 sync blocks of video data, as shown in FIG. 6. The interface block 2 sequentially reads out the temporarily stored track of data in units of 82 byte sync blocks in the order indicated by numbers 0, 1, 2, 3, 4 . . . in FIG. 7.

The data read out from the interface block 2 are supplied via the contact "a" of the switch 21 to the parity generator 3, which calculates the horizontal parity code C1, also referred to herein as parity data P1, and the vertical parity code C2, also referred to herein as parity data P2, for the input data and appends such parity codes to the read out data. The video and parity code data are supplied to the sync and ID code generator 4 which adds sync words and ID data to produce recording data in the format shown in FIG. 6.

The recording data are supplied to the channel encoder for modulation. The modulated data produced by the channel encoder 5 are supplied to the recording amplifier 6 to be amplified, and then the amplified data are supplied via the contact R of the switch 7 to the magnetic head 8, which records the data on each track of the magnetic tape 9.

The CPU 2a incorporated in the interface block 2 controls the formatting of the cells into sync blocks comprising logical tracks which are recorded in respective physical tracks on the magnetic tape 9 so that the priority data PD is positioned substantially at the center of each physical track on the magnetic tape.

The CPU 2a also compares the input data transmission rate with the recording rate on the magnetic tape 9 to decide whether the entirety of the input data can be temporarily stored without overflow and recorded on the magnetic tape 9 even if the priority data PD is repeated. If the recording rate is sufficiently high in comparison with the input data transmission rate, the priority data PD is repeated. If the recording rate on the magnetic tape 9 is not sufficiently high, the CPU 2a formats the priority data only once as original data and not again as repeat data.

Figure 8:
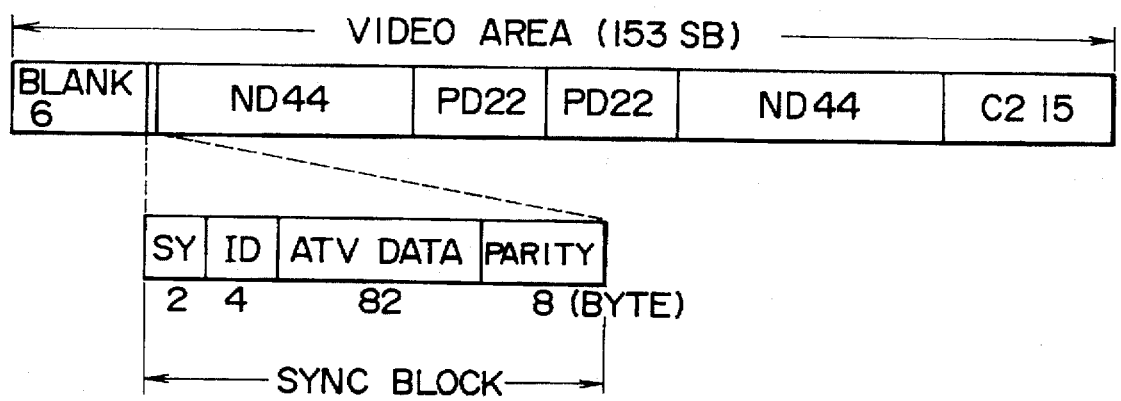
FIG. 8 illustrates the sync blocks in the video area of the data format shown in FIG. 6.

More specifically, as shown in FIG. 8, at the beginning of the video area of 153 sync blocks on each slant track, the CPU 2a formats blank data in a length of 6 sync blocks, then formats normal data as formatted normal data ND in a length of 44 sync blocks. Next, the CPU 2a formats the priority data PD as original formatted priority data in a length of 22 sync blocks and, assuming a sufficiently high recording rate, as repeat formatted priority data in a succeeding area of 22 sync blocks. Thus, in the present embodiment, the priority data PD is recorded twice, once as original data and once as repeat data. Subsequently, the CPU 2a formats normal data ND in a length of 44 sync blocks. As mentioned, the data in the respective sync blocks comprise a two-byte sync word, four bytes of ID data, 82 bytes of ATV data (video data) and an eight byte parity code.

Also as shown in FIG. 8, the vertical parity code C2 is placed in a length of 15 sync blocks by the parity generator 3.

In another recording operation, the processor 23 formats a luminance signal Y and color difference signals $P_R$, $P_B$ into digital video data in the format shown in FIG. 3. This digital video data is supplied through the contact "b" of switch 21 to the parity generator 3 to be recorded on the magnetic tape 9 in the manner generally described above.

A reproducing operation of the embodiment of the present invention shown in FIG. 1 will now be described below.

Data reproduced from the magnetic tape 9 by the magnetic head 8 is inputted via the contact P of the switch 7 to the head amplifier/equalizer 11 where the higher-frequency components are compensated. The compensated data are supplied to the channel decoder 12 to be demodulated. The demodulated data are applied to the sync-ID detector 13 for detection of the sync word and the ID data in each sync block, and thence to the TBC 14.

The corrected data produced by the TBC 14 are supplied to the ECC circuit 15 for error detection and correction. The corrected data is applied via the contact "a" of the switch 22 to the interface block 2.

The interface block 2 depacks the reproduced data in units of 82 bytes into data in units of 148 bytes. In this depacking, the data reproduced from the center area of each track, namely, two lengths of 22 sync blocks, are considered to be the priority data PD. Since the priority data is duplicated, the interface block 2 selects only one length of 22 sync blocks of the reproduced data as the priority data. The data reproduced from each area of 44 sync blocks before and after the priority data PD are processed as the normal data ND. The depacked data are outputted to the ATV codec 1.

The ATV codec 1 converts the priority data PD and normal data ND supplied thereto into cells in the format of FIG. 4 and delivers its output for use by another system, not shown. Data of multiple sync blocks are formed into each cell.

In another reproducing operation, the corrected data is applied through the contact "b" of switch 22 to the processor 23 which converts the corrected digital video data into a luminance signal Y and color difference signals $P_R$, $P_B$.

Figure 9:
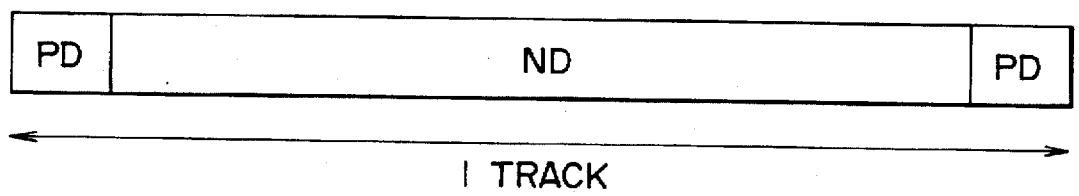
FIG. 9 illustrates another data format for a logical track recorded in a respective physical track.

In the embodiment described above, the priority data PD is positioned at the center of each track. However, the data arrangement in a logical track may be modified so that, as shown in FIG. 9, in a record (or physical) track the priority data PD is recorded at both ends of the track, while the normal data ND is recorded at the center of the track.

Figure 10:
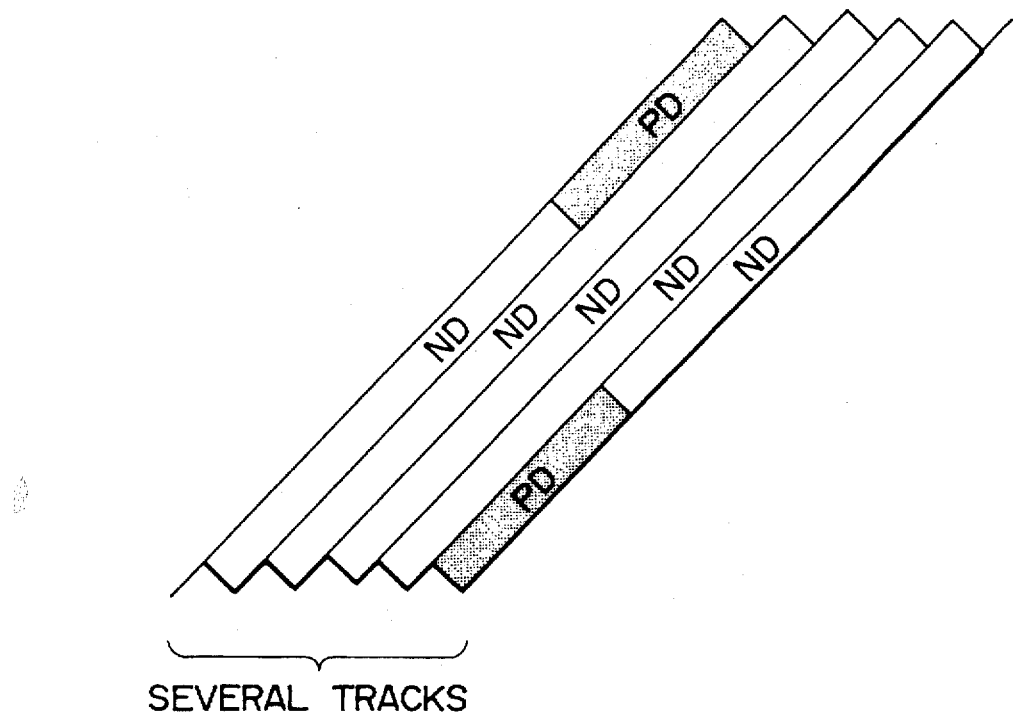
FIG. 10 illustrates a further data format for a logical track recorded in a respective physical track.

Additionally, when the video data of one frame is processed in a unit of plural tracks (e.g., four tracks), the priority data PD may be repeatedly recorded at predetermined positions on a plurality of tracks as shown in FIG. 10.

Figure 11:
FIG. 11 illustrates a data format for a portion of a logical track.
Figure 11:
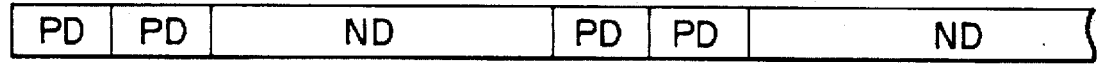

A further modification is possible as shown in FIG. 11 wherein formatted groups are recorded sequentially on each record track. Each formatted group contains a predetermined number of sync blocks of priority data PD followed by a predetermined number of sync blocks of normal data ND. In each formatted group, the sync blocks of priority data may include original or first priority data, and repetitions of the first priority data. For example, FIG. 11 shows first formatted priority data followed by repeat formatted priority data in each formatted group.

Although an illustrative embodiment of the present inventions and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A data recording apparatus comprising:

means for separating input data into priority data and normal data;

means for formatting said priority data and said normal data in a predetermined format in which said priority data is repeated to produce first formatted priority data, repeated first formatted priority data and formatted normal data wherein said first formatted priority data and said repeated first formatted priority data are the same; and means for recording said first formatted priority data, said repeated first formatted priority data and said formatted normal data in a record track on a recording medium.

2. The apparatus according to claim 1, wherein said input data comprises digital data representing an image.

3. The apparatus according to claim 2, wherein said digital data comprises discrete cosine transformation coefficients.

4. The apparatus according to claim 2, wherein said predetermined format is arranged in logical tracks, and said first formatted priority data and said repeated first formated priority data are substantially at a center of each logical track, and said means for recording records each logical track in a respective record track.

5. The apparatus according to claim 4, wherein said repeat formatted priority data comprises one repetition of said first formatted priority data.

* * * * *